Patented Apr. 5, 1927.

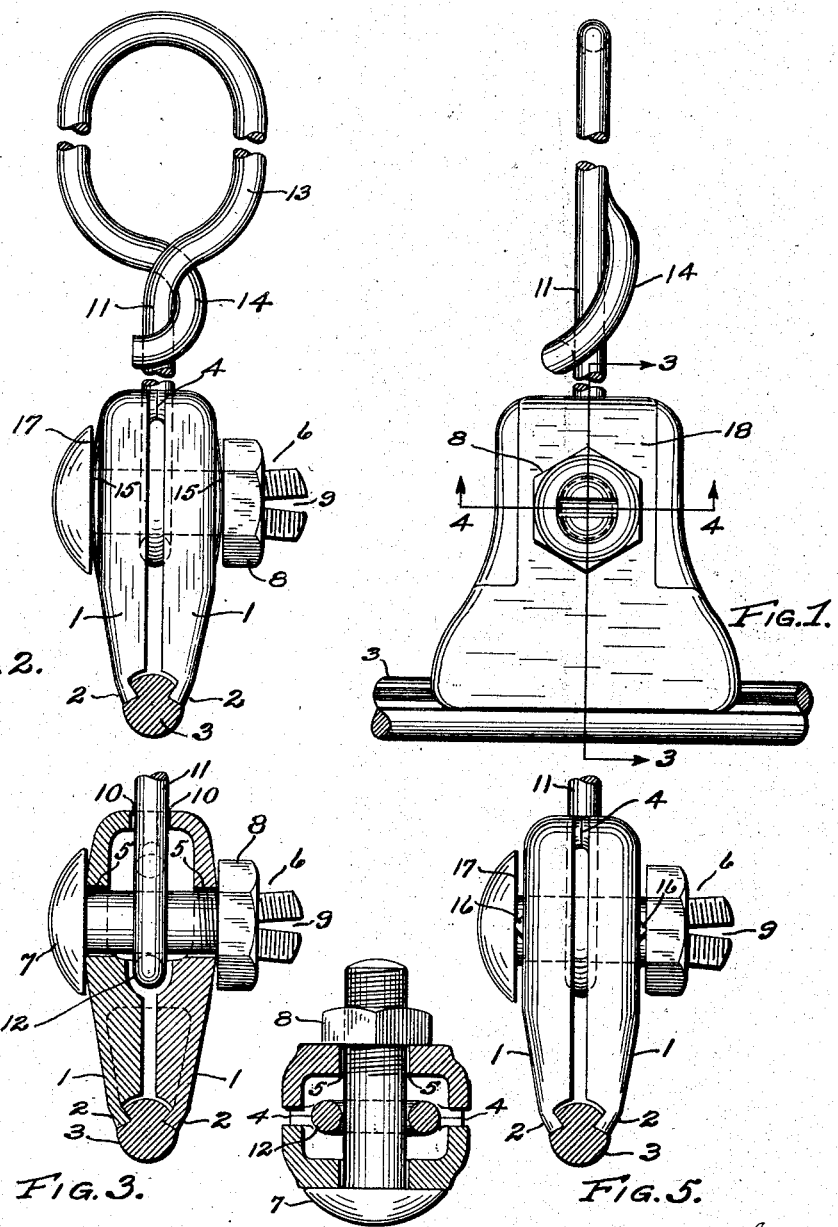

1,623,694

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed December 23, 1924. Serial No. 757,641.

My invention relates to supports for trolley conductors and has for its object a support in which clamping jaws are arranged to grip the trolley wire and which are held together by a clamping member and having a member to secure the clamping jaws to a support.

Trolley wires vary in size, depending upon the carrying capacity required, and to make a support in which a single set of clamping jaws will take care of the various sizes of trolley wire, means that the jaws will be spread farther apart at their lower end where they grip the trolley wire, the larger the size of the trolley wire, and this will mean that the relation between the exterior and oppositely disposed faces of the clamping jaws with respect to the clamping member will vary with the size of the trolley wire used.

In view of this, a further object of my invention is to so construct the exterior and oppositely disposed faces of the clamping jaws and the clamping faces of the clamping member as to produce a substantially uniform relation regardless of the size of trolley wire used in ordinary practice.

Other objects will disclose themselves as I further disclose my invention, which resides in the new and novel construction, combination and relation of the various parts hereinafter described and set forth in the drawing accompanying this specification.

In the drawing:

Fig. 1 is a side view in elevation of my invention.

Fig. 2 is an end view of Fig. 1.

Fig. 3 is a sectional view on the line 3—3 of Fig. 1.

Fig. 4 is a sectional view of Fig. 1 on the line 4—4.

Fig. 5 is a modification of the construction shown in Fig. 1.

In my preferred construction I employ a pair of clamping jaws 1, which I have shown as duplicates, and each is provided with a lip 2 at the lower end to engage and grip a trolley wire 3. The clamping jaws are adapted to engage at their upper edge and fulcrum about the engaging faces 4. The jaws are provided with registering recesses 5 and receive the clamping member 6, which comprises the bolt 7 and the nut 8. The bolt 7 is provided with a slot 9 which can be opened up after the device is installed upon the trolley wire and thereby spreading the ends of the bolt 7 and preventing the nut 8 from displacement.

The upper adjacent edges of the clamping jaws 1 are each provided with a groove 10 which register to form an orifice to receive the supporting member 11. The lower end of the supporting member 11 is formed into an eye 12 which encircles the transverse portion of the bolt 7 and constitutes the means for holding the supporting member 11 in combination with the jaws. The upper end of the supporting member 11 is formed into an eye member 13 which has an interlocking hook member 14 which can be sprung open so as to permit the hooking of the support 11 over a messenger cable, or other suitable support, and then rehooked into position to close the eye member 13 to prevent the displacement of the supporting member with respect to the messenger cable or other support.

It will be noted that the exterior surface 15 of the clamping jaws is curved where they contact with the head of the bolt 7 and the nut 8 and, as seen in Fig. 4, the contact between the exterior faces of the clamping jaws and the bolt and nut 7 and 8 is a line contact, and it will also be apparent that the line contact will be substantially the same regardless of the amount to which the jaws are spread apart or brought together at their lower edge within reason. In other words, the relation between the clamping jaws and the clamping member is maintained substantially constant regardless of the size of trolley wire used. It will be apparent that if the contact surface of the clamping jaws is flat and parallel with the adjacent engaging faces of the bolt and nut for a given size of wire, that if the wire is varied in size, then the contact surfaces between the clamping jaws and the clamping member will not be parallel, but that the contact will be between some portion of a face of the clamping jaws and the upper or lower edge of the nut 8 or the head of the bolt 7. With my improvement, however, the contact remains substantially constant regardless of the size of trolley wire used and adjacent the transverse axis of the bolt.

In Fig. 5 I have shown a modification of that shown in the previous figures, in that, I have employed a small raised rib 16 which provides a line contact between the clamping jaws and the bolt and nut 7 and 8 respectively.

It will be apparent to those skilled in the art that in place of making the clamping jaws 1 with the curved faces 15, that the face 17 of the bolt may be provided with the curved surface 15 and the faces of the clamping jaws remain flat, which is merely the transposing of the curved surface 15 from the clamping jaws to the head of the bolt 7, and the curved surface would also be transposed to the surface of the nut 8.

It might be said that the curved surface 15 is the result of providing the face of the clamping jaws 1 with a raised boss 18 which has its exterior surface adjacent the head of the bolt 7 or the nut 8 curved in one direction.

A somewhat similar result may be secured by making the surface of the raised boss 18 curved in all directions, in which case there would be contacting with the bolt and nut immediately around the edge of the orifice 5, or the same would be true if the face 17 of the bolt 7 and the face of the nut were made convex.

There are many modifications no doubt which will suggest themselves to those skilled in the art, but I do not wish to be limited other than by my claims.

I claim:

1. A trolley wire support comprising a pair of clamping jaws to grip a trolley wire, a support for the jaws and means to hold the jaws in clamping engagement with the wire, the said means comprising a transversely applied bolt and nut having the engaging faces of the bolt and nut contact with a curved surface on the clamping jaws to permit the jaws to be adjusted to different sizes of trolley wire without materially affecting the contact between the holding means and the jaws, and supporting means for the jaws comprising a member having a loop interlocked with the transverse holding means and a straight portion interlocked with the jaws and a loop to engage a supporting wire.

2. A trolley wire support comprising a pair of clamping jaws to grip a trolley wire, transversely disposed means to hold the jaws in engagement with the wire, means to offset the holding means from the jaws and form substantially a line contact between the holding means and the jaws, and a support for the jaws comprising a member interlocked with the transversely disposed means and having means to engage an overhead support.

3. A trolley wire support comprising a pair of clamping jaws to grip a trolley wire, transversely disposed means to hold the jaws in engagement with the wire and means to offset the holding means from the jaws and form substantially a line contact between the holding means and the jaws.

In testimony whereof I affix my signature.

SAMUEL S. MATTHES.